Patented Dec. 8, 1953

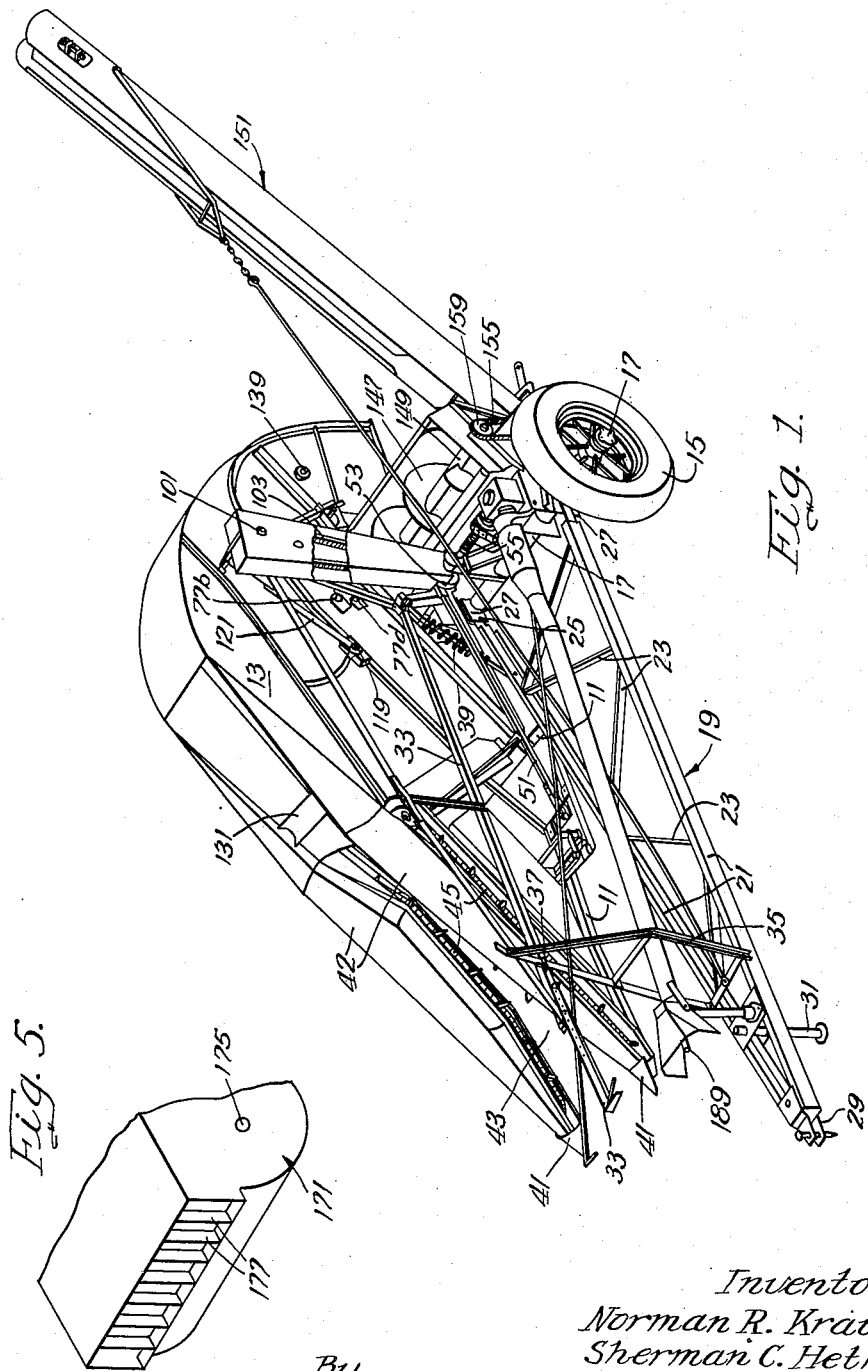

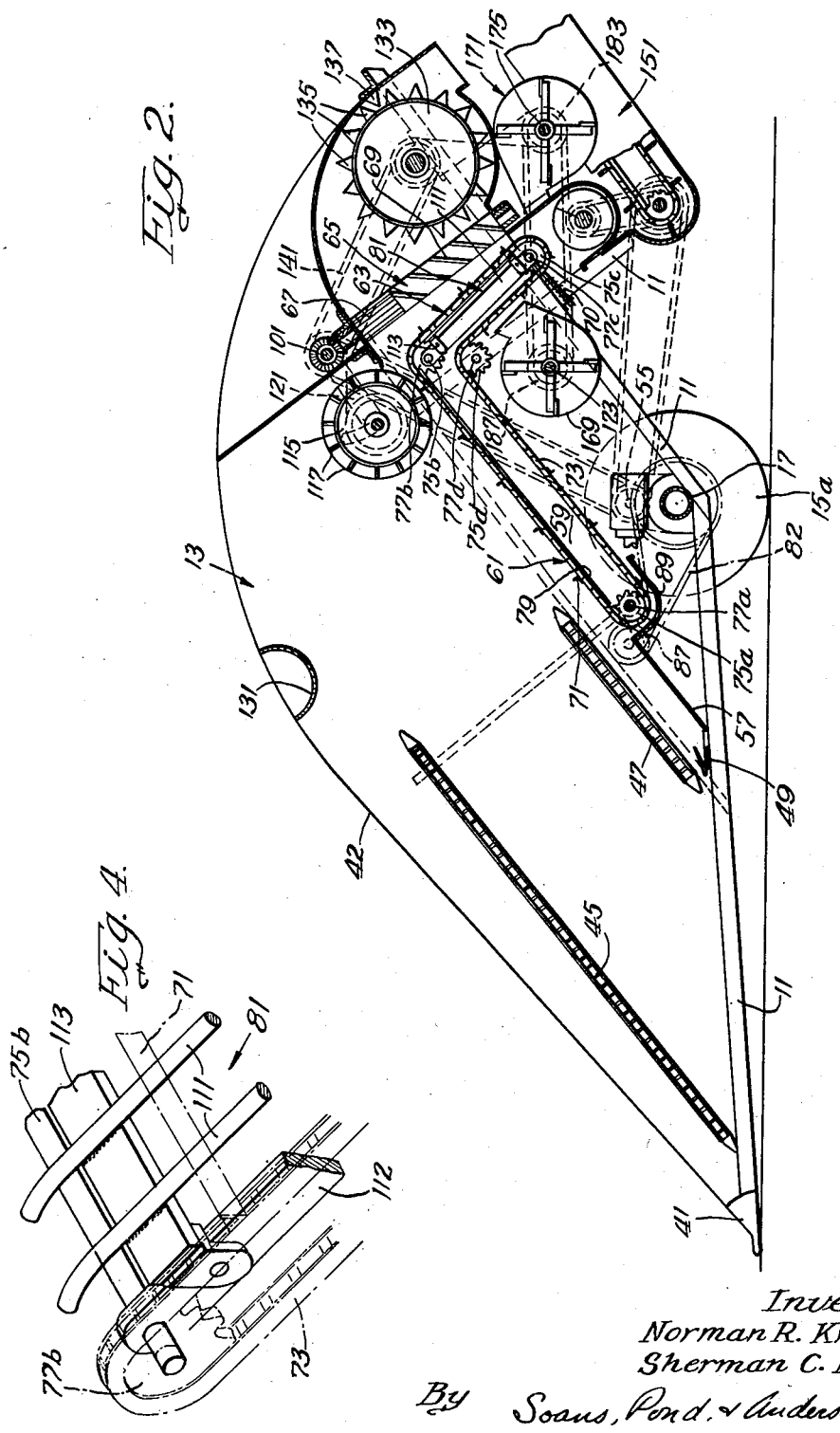

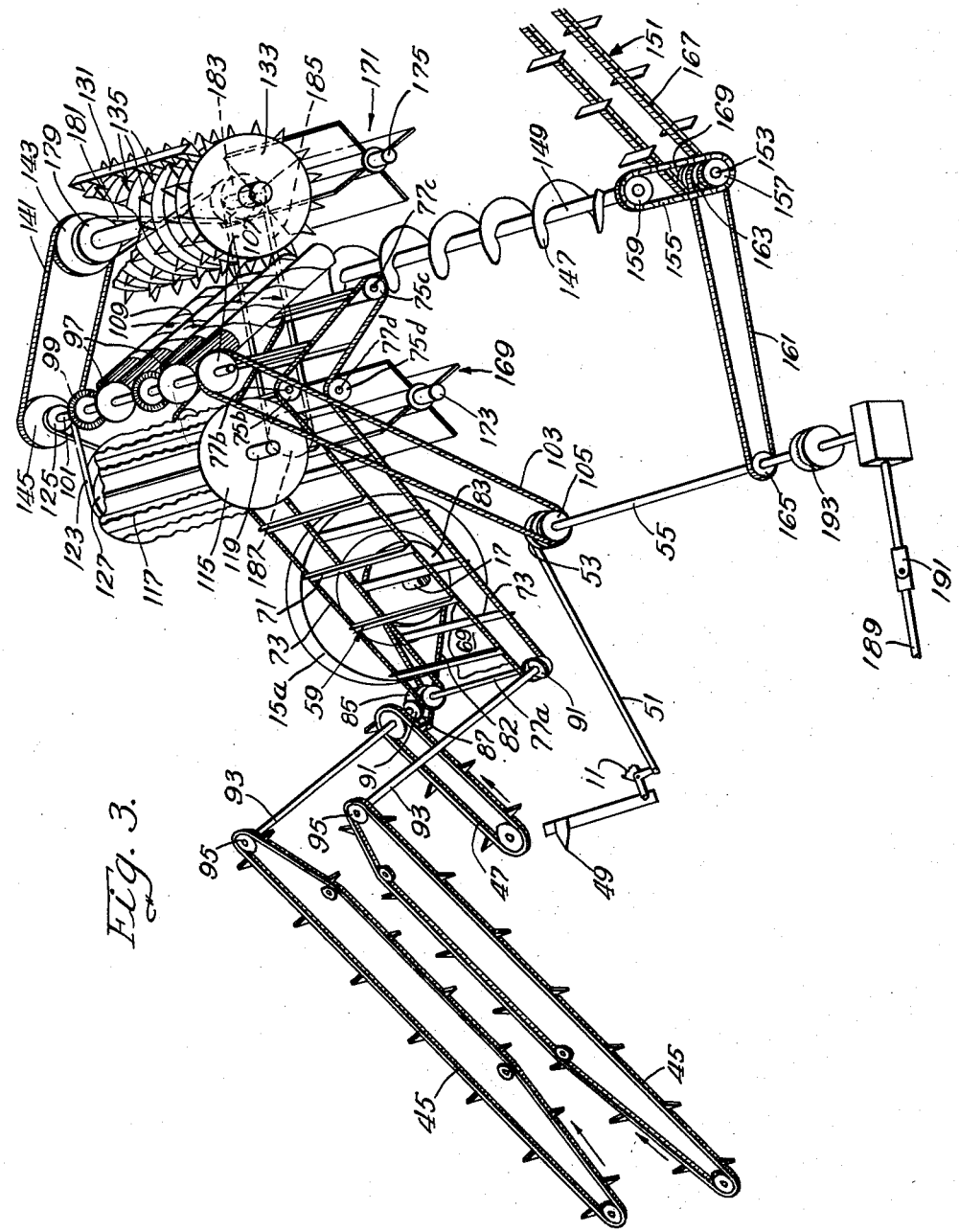

2,661,586

UNITED STATES PATENT OFFICE 2,661,586

CORN HARVESTER

Norman R. Krause and Sherman C. Heth, Racine, Wis., assignors to J. I. Case Company, Racine, Wis., a corporation of Wisconsin Application June 9, 1948, Serial No. 31,956

9 Claims. (Cl. 56—66)

The present invention relates to corn harvesters, corn pickers, and other like agricultural devices.

Heretofore, the provision of satisfactory equipment for the mechanical harvesting and picking of corn has been one of the most difficult problems in the agricultural implement art. Most known implements for harvesting or picking corn remove the corn ears from the stalk by means of open snapping rolls, which rotate at comparatively high speeds. These snapping rolls result in large losses of corn in the field because of the inherent shelling action of the rolls when they engage the ears of corn. The snapping rolls also tend to become clogged, with the result that a substantial number of ears are ground up or otherwise damaged. This clogging of the rolls occurs frequently because whenever the corn harvester is operated slightly out of line with the row of corn the complicated protecting structure surrounding the snapping rolls breaks the corn stalks which then lodge crosswise in the rolls. Moreover, even with a protecting structure, the snapping rolls are quite dangerous and have resulted in many injuries during each harvesting season.

Another disadvantage of most of the present corn harvesters is their inadaptability to recognized methods of corn borer control. The most effective practicable method of controlling this pest consists in plowing under rather deeply the stalk which serves as host to the borer during one phase of its life cycle. Existing harvesters either leave the stalks standing in the field or chop them into lengths suitable for ensilage, and in neither instance can the stalks be plowed under a sufficient distance to prevent the emergence of the adult insects in the spring.

The principal object of the present invention is to provide improved corn harvesting apparatus which effects efficient and safe harvesting. Another object of the invention is to provide improved apparatus of this type which facilitates the plowing-under of the corn stalks, and thus makes possible efficient corn borer control. Further objects and advantages of the invention will be apparent from references to the following description and the accompanying drawings.

In the drawings,

Fig. 1 is a perspective view with parts broken away of a corn harvester in accordance with the present invention;

Fig. 2 is a sectional, side elevational view of the harvester illustrated in the preceding figure;

Fig. 3 is an isometric view with parts broken away of the drive mechanism of the harvester;

Fig. 4 is an enlarged, fragmentary, perspective view of a portion of the downwardly moving section of the stalk conveyor and its associated supporting grill which forms a part of the apparatus illustrated in the preceding figures; and Fig. 5 is a fragmentary, perspective view of the discharge opening of the blower which is adapted to blow trash and dirt from the harvested ears of corn.

The corn harvester of the present invention includes means for gathering and cutting the stalks, means for snapping the ears from the cut stalks, conveyor means for moving the stalks from the cutting means to the snapping means, means for shredding the stalks after the ears have been removed, means for husking the ears and means for conveying the husked ears of corn to a trailing wagon or other transport vehicle. One of the features of the invention is the use of a combined snapping and husking means which will hereinafter be described in detail.

All of the elements of the harvester are supported upon a frame 11, the forward end of which is adjustable for height relative to the ground level, and which is supported upon wheels for movement in the field. The drive mechanism for the various elements also constitutes an important feature of the invention; the exposed elements are driven from a ground wheel while the remainder of the elements are adapted to be driven from the power takeoff of the tractor or other draft vehicle.

The main frame 11 is fabricated from suitable structural members which include angle, channel, and plate members, arranged so as to define a shell 13 for enclosing the moving elements of the implement. Suitable support wheels 15 and 15a are journaled on an axle 17 which is affixed to the main frame 11 in order that the harvester may be moved during use. A fabricated draw bar 19, which includes a pair of channel side sections 21 and suitable cross members 23, is hingedly connected to the axle 17 by means of suitable hinge pins 25 which engage gusset plates 27 welded to the axle 17. The illustrated embodiment of the invention is a pull-type implement, and it is intended to be drawn by, and powered from, a tractor. It will be understood, however, that many of the features of the invention are applicable to tractor-supported or self-powered implements as well as to other types of row crop processing and harvesting apparatus.

The forward end of the draw bar 19 is adapted to be connected to the tractor draw bar by means of a suitable hitch plate and pin 29. The draw bar 19 is provided with an adjustable stand 31, in order that it may be supported at the proper elevation when the harvester is being hitched to the tractor. The stand 31 is raised against the draw bar 19 during the operation of the machine.

During the operation of the harvester it is frequently necessary to adjust the height of the gathering and cutting means relative to the ground and, since the conditions requiring such adjustment may change from time to time, it is important that the apparatus include means whereby the relative height of the gathering and cutting means can be adjusted prior to the starting-up and actual running of the harvester in the field. In the illustrated embodiments of the invention, this relative adjustment is made possible by virtue of the fact that the draw bar 19 is hingedly connected to the frame 11 of the implement, which frame supports the various elements. Thus, by providing an adjustable connection between the draw bar 19 and the frame 11, it is an easy matter to adjust the height of the gathering and cutting means. In this connection the illustrated structure includes a forwardly extending adjusting lever 33 rigidly affixed to the frame 11, and adapted to be held in various positions relative to a draw bar 19 by means of a notched link 35 and spring latch connection 37.

The weight of the frame and the other elements of the harvester is counterbalanced by a compression spring 39 (Fig. 1) which is connected between the frame 11 and the draw bar 19. Movement of the adjusting lever 33 up and down relative to the draw bar 19, will rotate the counterbalanced elements about the main axle 17, and thereby alter the position of the gathering and cutting means relative to the ground level. In order that this adjustment may be made from the tractor unit without requiring the operator to stop the machine and dismount, the forward end of the adjusting lever 33 is carried to a point just above the end of the draw bar 19, and the weight, or a large portion of the weight of the mechanism carried on the main frame 11, is counterbalanced by the compression spring 39.

The stalk gathering and cutting means includes a pair of the usual fabricated divider points 41 which are supported on the forward end of the frame 11. The divider points 41 include rearwardly extending portions 42, fabricated of sheet metal, which are spaced apart a sufficient distance to define a stalkway 43. A pair of conventional, opposed, endless gathering chains 45 are supported along the upper edge of the inner surface of the rearwardly extending portions 42 of the divider points 41, substantially as illustrated. A single lower gathering chain 47 is supported on one of the divider points with its inner run in the stalkway 43, so that it guides the base of the stalk into the cutting means.

A cutter bar 49, driven by a pitman 51 journaled on a crank 53 on the main power shaft 55, is supported for reciprocating movement on the frame 11 at the base of the stalkway 43. The cutter knife 49 cooperates with a pair of stationary cutter knives (not shown) attached to the frame 11 adjacent the stalkway, to effect the cutting of the stalks. The upper gathering chains 45 and the lower gathering chain 47 cooperate to hold the stalk substantially upright and to move the stalk along the stalkway until the butt of the stalk engages a stationary conveyor or guide apron 57. The butt of the stalk is then moved along the guide apron 57 until it is engaged by an endless cross slat or raddle-type conveyor 59.

The endless conveyor 59 (Figs. 2 and 3) includes an upwardly moving section 61, which conveys the stalk of corn from the guide apron 57 to the combined ear snapping and husking means, and a downwardly moving section 63 which may be yieldingly biased against the snapping and husking means so as to cooperate with it to efficiently husk the corn. The combined ear snapping and husking means comprises two pairs of generally vertically extending, snapping rolls 65 which are supported in a position which is spaced from, and generally parallel to, the downwardly moving section 63 of the conveyor 59. Each of the snapping rolls 65 includes an upper snapping section 67 and a lower husking section 69. Each of these sections 67 and 69 are of conventional design, the snapping section 67 including generally longitudinally extending rib portions for gripping the stalks and the husking section 69 including spirally formed resilient portions which are adapted to strip the husk from the ear. In order to insure close contact between the ears of corn and the husking section 69 of the combined husking and snapping rolls 65, the downwardly moving section 63 of the conveyor 59 is resiliently biased against the husking section by a spring and rod assembly 70 in a manner which will be described in detail. This construction which combines an endless conveyor and a combination snapping and husking roll results in particular and important advantages in the fabrication and operation of the machine.

The conveyor 59 includes a plurality of spaced-apart cross slats 71 which are connected by chains 73 or the like, at their outer ends. The chains 73 are supported upon sprockets 75a, 75b, 75c, and 75d, keyed to suitable shafts 77a, 77b, 77c, and 77d, respectively, which are disposed, as necessary, along the runs of the conveyor 59. The shafts 77a, 77b, 77c and 77d are journaled into bearings in the frame 11 for rotatable movement. The upper or outer runs of the moving cross slats 71 are supported upon, and cooperate with a fixed pan 79 and a swingably supported open grill structure 81; the pan 79 being disposed under the upwardly moving section 61 of the conveyor 59 and the grill being disposed under the downwardly moving section 63 of the conveyor 59.

The conveyor 59 is driven from one of the supporting wheels 15a by means of a drive chain 82 which connects a sprocket 83 attached to the wheel 15a with a sprocket 85 attached to the forward supporting shaft 77a of the conveyor. In order that the conveyor 59 will move crop materials rearwardly, the chain 82 engages the under side of the sprocket 85, the upper loop of the chain 82 being supported on an idler sprocket 87. Thus, the conveyor 59 moves at a linear speed which is always proportional to the ground speed of the implement, and thereby substantially eliminates the possibility of clogging the mechanism when the rate of travel in the field is varied. A fabricated deflector 89 protectively surrounds the lower portion of the forward shaft 77a so that crop materials do not become entangled with the shaft 77a or its associated sprockets 75a or chains 73.

The gathering chains 45 and 47 are driven from the conveyor drive shaft 77a by a positive connection which includes bevel gear pairs 91 and vertically extending shafts 93. The individual gathering chains 45 and 47 are driven from sprockets 95 which are keyed to the shafts 93. Thus the gathering chains 45 and 47 are also driven at a linear speed which is proportioned to the rate of movement of the implement along the field.

The snapping rolls 65 are journaled into suitable bearings in the frame 11 and are driven by means of bevel gears 97 attached to the upper ends of the rolls 65 which mesh with bevel gears 99 on a cross drive shaft 101. The cross drive shaft 101 is operatively connected to the main drive shaft 55 by means of a chain 103 which engages a sprocket 105 on the main drive shaft 55 with a sprocket 107 on the cross drive shaft 101. The snapping rolls 65 operate in pairs and are adapted to rotate as indicated by the arrows 109 in Fig. 3.

The open grill structure 81 (Fig. 4) which cooperates with the downwardly moving section 63 of the conveyor 59 includes a plurality of parallel, spaced-apart rods 111 which are disposed with their axes directed longitudinally along the line of movement of the conveyor 59. The space between the rods 111 is such that an ear of corn will slide along the rods 111 but will not fall through the space between the rods 111. The rods 111 are rigidly attached to a supporting frame which includes a pair of longitudinally extending members 112 and a pair of transversely extending members 113. Each of the rods 111 are conveniently attached to the transversely extending members 113 by welding or the like. The upper ends of each of the longitudinally extending frame members 112 are journaled into the conveyor supporting shaft 75b so as to permit the grill structure to swing without overly affecting the tautness of the conveyor chains 73. The shaft 77c at the bottom of the downwardly moving section 63 of the conveyor is journaled in the lower ends of the longitudinally extending members 112 so that the supporting sprockets 75c keyed thereto, will swing with the grill structure 81. The lower end of the grill structure 81 is biased against the husking section 69 of the husking and snapping rolls 65 by means of the rod and spring assemblage 70.

The beater or feed roll 115 is supported above the delivery end of the upwardly moving section of the conveyor 59 so as to cooperate in moving the cut stalks into the snapping rolls 65. The feed roll 115 is fabricated with a plurality of longitudinally extending ribs 117 and is supported upon a shaft 119 which is journaled in bearings on the ends of suitable link members 121. The link members 121 are attached to the main frame 11 at a point adjacent the end of the cross drive shaft 101, and thus resiliently support the feed roll 115 above the conveyor 59. Under most operating conditions and especially when operating the harvester in corn which has stalks having hard, green, butts, it is especially desirable to position the feed roll 115 as closely as possible to the snapping rolls 65 so that the feed roll can exert a maximum force upon the stalks and force them against the snapping rolls. The feed roll 115 is driven by a V-belt 123 which connects a pulley 125 on the cross drive shaft 101 with a pulley 127 on the feed roll supporting shaft 119. The link member 121 being pivotally attached to the frame 11 adjacent the cross drive shaft 101 permits movement of the feed roll 115 without requiring changes in the length of the belt 123.

A transversely extending bumper 131 is adapted to be attached to the frame 11 at the upper end of the stalkway 43 (Figs. 1 and 2). The bumper 131 engages the upper end of the stalk and aids the conveyors in tipping it so that it moves into the ear snapping means butt first.

A shredder cylinder 133 having a plurality of spaced-apart knives 135 is supported to the rear of the snapping rolls 65 in a position which insures the feeding of the stripped stalks into the shredding cylinder 133. Coacting, fixed, shredder knives 137 are supported on a cross member of the frame 11, and the clearance between these knives and the knives 135 on the shredder cylinder 133, is adjusted so that the desired shredding action is accomplished. The shredder cylinder 133 is supported upon a shaft 139 journaled into bearings on the frame 11. The shredder cylinder 133 is rotated by a drive chain 141 which connects a sprocket 143 on the cylinder supporting shaft 139 with a sprocket 145 on the cross drive shaft 101.

An open topped, transversely extending conveying auger 147 is supported upon a shaft 149 journaled into bearings on the frame 11, moves the snapped ears across the implement to a wagon elevator 151. The wagon elevator 151 extends to the rear of the implement and is adapted to discharge the ears into a trailing wagon. The conveying auger 147 is driven from a stub shaft 153 by means of a drive chain 155 which connects a sprocket 157 on the stub shaft 153 with a sprocket 159 on the auger supporting shaft 149. The stub shaft 153 is operatively connected to the main drive shaft 55 by means of a chain 161 which connects a sprocket 163 on the stub shaft 153 with a sprocket 165 on the main drive shaft 55. The wagon elevator 151 is of the conventional, cross flight, endless chain type and its chain 167 directly engages a sprocket 169 which is keyed to the stub shaft 153.

A pair of fans 169 and 171 are provided for continuously cleaning the snapping rolls 65 and the shredder cylinder 133; the direction of air flow from the fan outlets is such that trash, dirt, and other material is prevented from falling with the ears into the auger 147. The fan 169 is supported upon a shaft 173 which is journaled in the main frame 11. The fan 169 is disposed below the delivery end of the conveyor 59, and its air stream is directed upwardly against the snapping rolls 65 so that light material which is broken away by the snapping rolls is kept in contact with the rolls 65 until it is passed through the rolls into the shredder 133. In this connection it will be noted that the construction of the grill 81 and the downwardly moving section 63 of the conveyor 59 is such that there is but little interference with the flow of air.

The second fan 171, is supported upon a shaft 175 which is journaled in the main frame 11. The fan 171 is disposed below the shredding cylinder 133 and its outlet is disposed forwardly so that a stream of air is directed across the top of the auger 147. This stream of air effectively removes any trash or dirt which may fall into the auger 147 from the husking mechanism.

A protective grating 177 is desirably provided across the outlet of fan 171 so as to prevent the ears of corn from falling into the fan housing (Fig. 5). The fans 169 and 171 are driven from a pulley 179 on the shredder cylinder shaft 139 by means of a V-belt 181 which engages one groove of a double pulley 183 on the shaft 175 of the fan 171. The fan 169 is driven from the other groove of the double pulley 183 by a belt 185 which engages a pulley 187 on the shaft 173 of the fan 169.

The main drive shaft 55 for the implement is connected by suitable drive means which includes a power take-off shaft 189 and universal joints 191, to the power take-off of a tractor. Between the power take-off shaft 189 and the main drive shaft 55, a jump clutch 193 is provided which protects the various drive elements. An overrunning clutch (not shown) is also provided for the ground wheel driven elements; this clutch may be conveniently attached adjacent the sprocket 85 on the shaft 77a. It is understood that the necessary idlers and belt and chain tighteners are provided for the various drives.

During operation of the implement the corn stalks are guided by the divider points 41 and the gathering chains 45 and 47 into the rear of the stalkway 43, where they are cut by the reciprocating cutting knife 49. The gathering chains move the butt of the stalk up the conveyor apron 57, to a point where the stalk is engaged by the endless conveyor 59. The cooperating action of the conveyor 59, the feed roll 115, the bumper 131, and the gathering chains 45 and 47 effectively tilts the stalk so that it passes butt first through the snapping rolls 65. The stalk, as it passes through the snapping rolls 65, is engaged by the knives on the shredder cylinder 131, and the fixed shredder knives 137 effectively shred the stalk and discharge the shredded material onto the ground, all as a continuous process. The snapped ears are carried downwardly by the downwardly moving section 63 of the conveyor 59 so that they are rubbed against the lower or husking portion 69 of the combined snapping and husking rolls 65, so as to effect the removal of the husk. The husked ears fall into the conveying auger 147 which conveys them to the wagon elevator 151. The fans 169 and 171 continuously blow the broken husk, stalk portions, dirt and trash, away from the ears of corn so that they are effectively cleaned as they are husked.

The various elements of our improved corn harvester cooperate to effect the efficient and safe harvesting of corn with minimum loss during harvesting operation. The gathering chains and the conveyor are driven in relation to the ground speed of the implement so that few stoppages occur. If, however, the implement does become clogged, arrangement of the parts is such that it is difficult for the operator to injure himself in clearing the machine because the exposed moving parts, the gathering chains and the conveyor, become stationary as soon as the forward motion of the machine is stopped. The position of the combined snapping and husking rolls is such that the corn falls free of the rolls after snapping and during the husking operation so that shelling of the ears and the grinding of any corn kernels which may be shelled from the ears are substantially eliminated. The cooperation which is effected between the two-section conveyor and the combined snapping and husking rolls eliminates many moving parts with a resultant increase in efficiency and a substantial decrease in construction and maintenance costs.

Various features of our invention that are believed to be new are set forth in the appended claims.

We claim:

1. In combination in a corn harvester of the class described which includes a frame and cutting means for severing the ear-bearing stalks of corn, a plurality of cooperating, generally vertically extending snapping rolls having upper snapping portions for removing ears from the stalks and lower husking portions for removing husks from the ears, said rolls being supported on said frame at a point spaced from said stalk severing means, and an endless conveyor for moving the severed stalks away from said cutting means to said snapping rolls, said endless conveyor including a generally upwardly moving section which extends from a point adjacent said cutting means to a point adjacent the upper portions of said rolls and a downwardly moving section which extends downwardly along the lower portions of said rolls, means supporting said downwardly moving section, and resilient means biasing said supporting means and said downwardly moving section toward said lower roll portions.

2. In combination in apparatus for removing ears of corn from their associated stalks and for husking the ears of corn, a plurality of generally vertically extending snapping rolls having upper snapping portions for removing the ears from the stalks and lower husking portions for removing husks from the ears, and an endless conveyor for moving the stalks from a stalk receiving point to said rolls, said endless conveyor including a first section disposed generally normal to said rolls and extending from said receiving point to a discharge point adjacent the upper portions of said rolls and a second section which extends from a point adjacent said discharge point along the lower portions of said rolls, said second section being hingedly supported about a pivot point which is located adjacent said discharge point, and resilient means biasing said second section toward the lower portion of said rolls whereby ears of corn removed from said stalks by said snapping portions are carried along said husking portions so as to effect the removal of said husks.

3. In combination in apparatus for removing ears of corn from their associated stalks and for husking the ears of corn, a plurality of generally vertically extending rolls having upper snapping portions for removing the ears from the stalks and lower husking portions for removing husks from the ears and an endless cross slat conveyor for moving the stalks from a stalk receiving point to said rolls, said endless conveyor including a first section disposed generally normal to said rolls and extending from said receiving point to a discharge point adjacent the upper portions of said rolls and a second section which is downwardly moving and which extends generally parallel to the axis of said rolls along the lower portions thereof, said second section of said cross slat conveyor being supported upon a grill having a plurality of elongated spaced apart guide members, said guide members being generally parallel to the axis of said rolls, said grill being hingedly supported about a pivot point which is located adjacent said discharge point, resilient means for biasing said grill and said associated section of cross slat conveyor toward the lower portion of said rolls, whereby ears of corn removed from said stalks by said snapping portions are carried along said husking portions so as to effect the removal of said husks, and blower means for continuously producing a blast of air through said grill against said rolls so as to engage trash and husk materials removed from said ears by said rolls.

4. In combination in a corn harvester of the class described which includes a frame and cutting means mounted on said frame of severing the ear-bearing stalks of corn, a plurality of cooperating, generally vertically extending rolls having upper snapping portions for removing ears from the stalk and lower husking portions for removing husks from the ears, said rolls being supported on said frame above and at a point spaced from said stalk severing means, an endless, cross slat type conveyor which includes an upwardly moving section which extends from a point adjacent said cutting means to a point adjacent the upper portions of said rolls, and a downwardly moving section which extends downwardly along the lower portions of said rolls, a flat tray which is disposed in supporting position beneath said upwardly moving conveyor section, a plurality of elongated, spaced-apart guide members which extend longitudinally of said downwardly moving section in supporting position therebeneath, said downwardly moving section and said guide members being spaced from said lower roll-portions, and resilient means urging said guide members and said downwardly moving conveyor section toward said rolls.

5. In combination in a corn harvester of the class described which includes a frame and cutting means for severing the ear-bearing stalks of corn, a plurality of cooperating, generally vertically extending rolls having upper snapping portions for removing ears from the stalks and lower husking portions for removing husks from the ears, said rolls being supported on said frame at a point spaced from said stalk severing means, an endless, cross slat type conveyor which includes an upwardly moving section which extends from a point adjacent said cutting means to a point adjacent the upper portions of said rolls and a downwardly moving section which extends along the lower portions of said rolls, a flat tray which is disposed in supporting position beneath said upwardly moving section, a plurality of elongated, spaced-apart guide members which extend longitudinally of said downwardly moving sections in supporting position therebeneath, said downwardly moving section and said guide members being spaced from said lower roll-portions, and resilient means biasing said guide members and said downwardly moving section toward said lower roll-portions so that ears of corn removed from the stalks by said snapping portions are moved downwardly and are husked by the cooperating action of said conveyor and said husking portions, and a blower having an outlet which is adapted to direct a stream of air through said downwardly moving section of said cross slat conveyor against said snapping rolls.

6. In a corn harvester which is adapted to be moved about a field, a frame, means supported on said frame for severing the ear-bearing stalks of corn, a plurality of cooperating, generally vertically extending rolls having upper snapping portions for removing ears from the stalks and lower husking portions for removing husks from the ears, said rolls being supported on said frame at a point spaced from said stalk severing means, an endless cross slat type conveyor which includes an upwardly moving section which extends from a point adjacent said cutting means to a point adjacent the upper portions of said rolls and a downwardly moving section which extends downwardly along the lower portions of said rolls, a plurality of elongated, spaced-apart guide members which extend longitudinally of said downwardly moving section in supporting position therebeneath, said downwardly moving section and said guide members being spaced from and resiliently biased toward said rolls, means adjacent said snapping rolls for shredding the stalks of corn, said shredding means including rotatable, power driven shredding knives, means for delivering the shredded stalks of corn to the ground, a second conveyor supported on said frame below said rolls for moving the husked ears of corn to a transport vehicle, and at least one blower supported on said frame and having its outlet so positioned that the air stream produced thereby is directed through said downwardly moving section and said guide members, against said rolls and said ears of husked corn so as to transport the freed husks to said shredding means.

7. In a corn harvester adapted to be drawn by and powered from a tractor, a frame, spaced-apart support wheels journaled on said frame, means supported on said frame for severing the stalks of corn, said means including spaced-apart side members defining a stalkway, at least one chain rake disposed along said stalkway for gathering the stalks in upright position, and cutting means which is supported within said stalkway, cooperating, generally vertically disposed snapping rolls for removing the ears from the severed stalks, a conveyor for moving the severed stalks from said cutting means to said snapping rolls, stalk tilting means in said stalkway, a power driven feed roll above said conveyor, resilient means biasing said feed roll against said conveyor, said tilting means, said feed roll and said conveyor cooperating to effect the movement of the stalks butt-first into said snapping rolls, means for shredding the stalks after the ears have been removed therefrom, means for husking the ears and means for conveying the husked ears to a transport vehicle, said first conveyor and said chain rake being powered from an operative connection to one of said support wheels, said cutting means, said first conveyor means, said feed roll, said snapping rolls and said shredding means being in substantially linear alignment.

8. In a corn harvester of the type which is adapted to be moved about a field and which has means disposed within a stalkway for gathering and severing ear-bearing stalks in upright position, the combination of a plurality of generally vertically disposed, cooperating rolls having upper snapping portions and lower husking portions, an endless conveyor having angularly disposed sections, one of said sections extending from said gathering means to the snapping portions of said rolls, another of said sections extending substantially parallel to the husking portion of said rolls, resilient means urging said other section toward said husking portions, tilting means in said stalkway for laying the stalks butt-first along the said first conveyor section, a power driven feed roll disposed above said first conveyor section and biased toward said section, and shredding means disposed adjacent the snapping portions of said rolls whereby said stalks are passed by said rolls into said shredding means, said first conveyor section, said snapping portions and said shredding means being in substantially linear alignment.

9. In a corn harvester adapted to be moved about a field, stalk gathering means for gathering ear-bearing corn stalks in an upright position, stalk severing means, a pair of generally vertically extending cooperating rolls having upper snapping portions and lower husking portions, an endless conveyor extending between said stalk severing means and said snapping portions, stalk tilting means, means for rigidly supporting said stalk tilting means above said conveyor, said conveyor and said stalk tilting means co-acting to turn the severed stalks to a generally horizontal position and to deliver them butt-first to said snapping portions, stalk shredding means adjacent said snapping portions for shredding the stalks discharged from said snapping portions, and a conveyor means disposed along said husking portions and resiliently biased thereagainst for receiving the ears of corn snapped from the stalks by said snapping portions and carrying the ears along said husking portions, said stalk severing means, said endless conveyor, said cooperating rolls, and said shredding means being in substantial linear alignment in the stated order in the direction of stalk flow through the harvester.

NORMAN R. KRAUSE.
SHERMAN C. HETH.

References Cited in the file of this patent

UNITED STATES PATENTS

| Number | Name | Date |
|---|---|---|
| 28,884 | Mefford | June 26, 1860 |
| 584,889 | Packer | June 22, 1897 |
| 898,392 | Springer | Sept. 8, 1908 |
| 906,868 | Gasser | Dec. 15, 1908 |
| 1,088,636 | Tabbert | Feb. 24, 1914 |
| 1,340,461 | Ronning et al. | May 18, 1920 |
| 1,528,635 | Ronning et al. | Mar. 3, 1925 |
| 1,600,212 | Berger | Sept. 21, 1926 |
| 1,722,717 | Trottman | July 30, 1929 |
| 1,810,600 | Giermann | June 16, 1931 |
| 1,894,412 | Neighbour | Jan. 17, 1933 |
| 2,001,351 | Nuttleman | May 14, 1935 |
| 2,333,901 | Swenson | Nov. 9, 1943 |
| 2,379,822 | Mitchell et al. | July 3, 1945 |
| 2,385,193 | Burgin | Sept. 18, 1945 |
| 2,420,543 | Johnson et al. | May 13, 1947 |
| 2,517,401 | Millard et al. | Aug. 1, 1950 |